US010261320B2

(12) United States Patent
Kress et al.

(10) Patent No.: US 10,261,320 B2
(45) Date of Patent: Apr. 16, 2019

(54) MIXED REALITY DISPLAY DEVICE

(71) Applicant: Microsoft Technology Licensing, LLC, Redmond, WA (US)

(72) Inventors: Bernard C. Kress, Redwood City, CA (US); R. Andrew Wall, Kikland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/199,646

(22) Filed: Jun. 30, 2016

(65) Prior Publication Data
US 2018/0003972 A1    Jan. 4, 2018

(51) Int. Cl.
| G02B 27/14 | (2006.01) |
| G02B 27/01 | (2006.01) |
| G02B 3/14 | (2006.01) |
| G02B 5/09 | (2006.01) |

(52) U.S. Cl.
CPC .......... *G02B 27/0172* (2013.01); *G02B 3/14* (2013.01); *G02B 5/09* (2013.01); *G02B 27/0179* (2013.01); *G02B 2027/015* (2013.01); *G02B 2027/0123* (2013.01); *G02B 2027/0152* (2013.01); *G02B 2027/0185* (2013.01)

(58) Field of Classification Search
CPC ........ G02B 27/0172; G02B 3/14; G02B 5/09; G02B 27/0179; G02B 2027/0185; G02B 2027/015; G02B 2027/0152; G02B 2027/0123

See application file for complete search history.

(56) References Cited

U.S. PATENT DOCUMENTS

| H000423 H | * | 2/1988 | Mohon |
| 5,619,373 A |  | 4/1997 | Meyerhofer et al. |
| 6,236,511 B1 |  | 5/2001 | Brown |
| 7,095,562 B1 |  | 8/2006 | Peng et al. |
| 7,397,606 B1 |  | 7/2008 | Peng et al. |
| 7,656,585 B1 |  | 2/2010 | Powell et al. |
| 2002/0047987 A1 |  | 4/2002 | Massengill et al. |

(Continued)

FOREIGN PATENT DOCUMENTS

| CN | 204964882 U | 1/2016 |
| EP | 2618202 A1 | 7/2013 |

(Continued)

OTHER PUBLICATIONS

Cheng, D. et al., "Design of an optical see-through head-mounted display with a low f-number and large field of view using a freeform prism", Journal of Applied Optics, vol. 48, No. 14, Published May 5, 2009, 14 pages.

(Continued)

*Primary Examiner* — Alicia M Harrington
(74) *Attorney, Agent, or Firm* — Alleman Hall Creasman & Tuttle LLP

(57) ABSTRACT

Examples are disclosed that relate to mixed reality display devices. One example provides a head-mounted display device comprising, a display, a lens system, and a curved Fresnel combiner. The curved Fresnel combiner is configured to direct light received from the display via the lens system toward an eyebox, and is at least partially transmissive to background light.

18 Claims, 4 Drawing Sheets

(56) References Cited

U.S. PATENT DOCUMENTS

| | | |
|---|---|---|
| 2002/0181115 A1 | 12/2002 | Massof et al. |
| 2002/0196554 A1 | 12/2002 | Cobb et al. |
| 2004/0085648 A1 | 5/2004 | Tomono |
| 2004/0150758 A1 | 8/2004 | Tomono |
| 2006/0098293 A1 | 5/2006 | Garoutte et al. |
| 2007/0177275 A1 | 8/2007 | McGuire |
| 2009/0201589 A1 | 8/2009 | Freeman |
| 2012/0120498 A1 | 5/2012 | Harrison et al. |
| 2014/0146394 A1 | 5/2014 | Tout et al. |
| 2015/0036223 A1 | 2/2015 | Dobschal et al. |
| 2015/0237336 A1 | 8/2015 | Sylvan et al. |
| 2016/0011341 A1 | 1/2016 | Smith |
| 2016/0131907 A1* | 5/2016 | Martinez ............ G02B 17/0832 359/631 |
| 2016/0282616 A1* | 9/2016 | Matsushita ........ G02B 27/0101 |

FOREIGN PATENT DOCUMENTS

| | | |
|---|---|---|
| EP | 2947502 A1 | 11/2015 |
| JP | 2009-232133 | * 10/2009 |
| WO | 2012052981 A2 | 4/2012 |
| WO | 2015037417 A1 | 3/2015 |
| WO | 2015129828 A1 | 9/2015 |

OTHER PUBLICATIONS

Stevens, Tim, "Toshiba Glass betters Google Glass display tech, but you can't buy it". CNET Article. Oct. 8, 2014. 4 pages. Available at: http://www.cnet.com/news/toshiba-glass-betters-google-glass-display-tech-but-tosh-says-you-cant-buy-it/.

Oliver, "UK based TTP develops better than Google smart glasses". Idealo Article. Sep. 12, 2012. 6 pages. Available at: http://news.idealo.co.uk/news/19076/uk-based-ttp-develops-better-than-google-smart-glasses#respond.

Ingraham, Nathan, "Carl Zeiss thinks it can make smart glasses you'll want to wear". Engadget article. Jan. 9, 2016. 4 pages. Available at: http://www.engadget.com/2016/01/09/carl-zeiss-smart-lens-curved-glass/.

ORA-2: AR glasses by Optinvent. Retrieved on Apr. 19, 2016. 6 pages. Available at: http://www.optinvent.com/.

"International Search Report and Written Opinion Issued in PCT Application No. PCT/US2017/038921", dated Oct. 16, 2017, 21 Pages. (MS# 359715-WO-PCT).

* cited by examiner

MIXED REALITY DISPLAY DEVICE

BACKGROUND

In a mixed reality display device, real imagery of a physical environment may be combined with virtual imagery produced by a display to provide mixed reality imagery. Various optical systems may be used to direct and combine virtual imagery with real imagery.

SUMMARY

Examples are disclosed that relate to mixed reality display devices. One example provides a display device comprising, a display, a lens system, and a curved Fresnel combiner. The curved Fresnel combiner is configured to direct light received from the display via the lens system toward an eyebox, and is at least partially transmissive to background light.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, a mixed reality display device may optically combine real imagery of a physical environment with virtual imagery produced by a display. Some mixed reality display devices may use reflective and/or refractive optical elements to produce mixed reality imagery. An optical combiner, for example, may fold an optical axis along which display light propagates, and refract background light from the surrounding physical environment, to combine the light and thereby mix real world and virtual images.

An optical combiner may employ optical power to limit the size of ray bundles propagating from the display along the optical axis. For head-mounted displays (HMDs) and other systems in which a relatively large field-of-view (FOV) and eye relief is desired, the size of the optical combiner may increase as a function of the fold angle, which may result in increased packaging size and decreased aesthetic quality and wearability. Other factors, such as the placement of a display and/or optical components proximate a user's temples, and component tilting toward the user's nose, also may contribute to undesirable form factors in mixed reality HMDs. Further, virtual imagery presented by a mixed reality HMD, which may be take the form of collimated or near-collimated light, may be perceptible to external observers, limiting a wearer's privacy.

Accordingly, examples are disclosed that relate to employing a curved Fresnel combiner comprising optical power in a display system to deliver mixed reality imagery to a user. As described in further detail below, the Fresnel combiner is at least partially transmissive to background light, and may be configured to form a virtual image in a manner that limits or prevents perception by external observers. The Fresnel combiner may provide a high degree of optical folding, thereby helping to achieve a smaller packaging size and weight when implemented in an HMD than non-Fresnel combiners having similar optical power.

Figure 1:
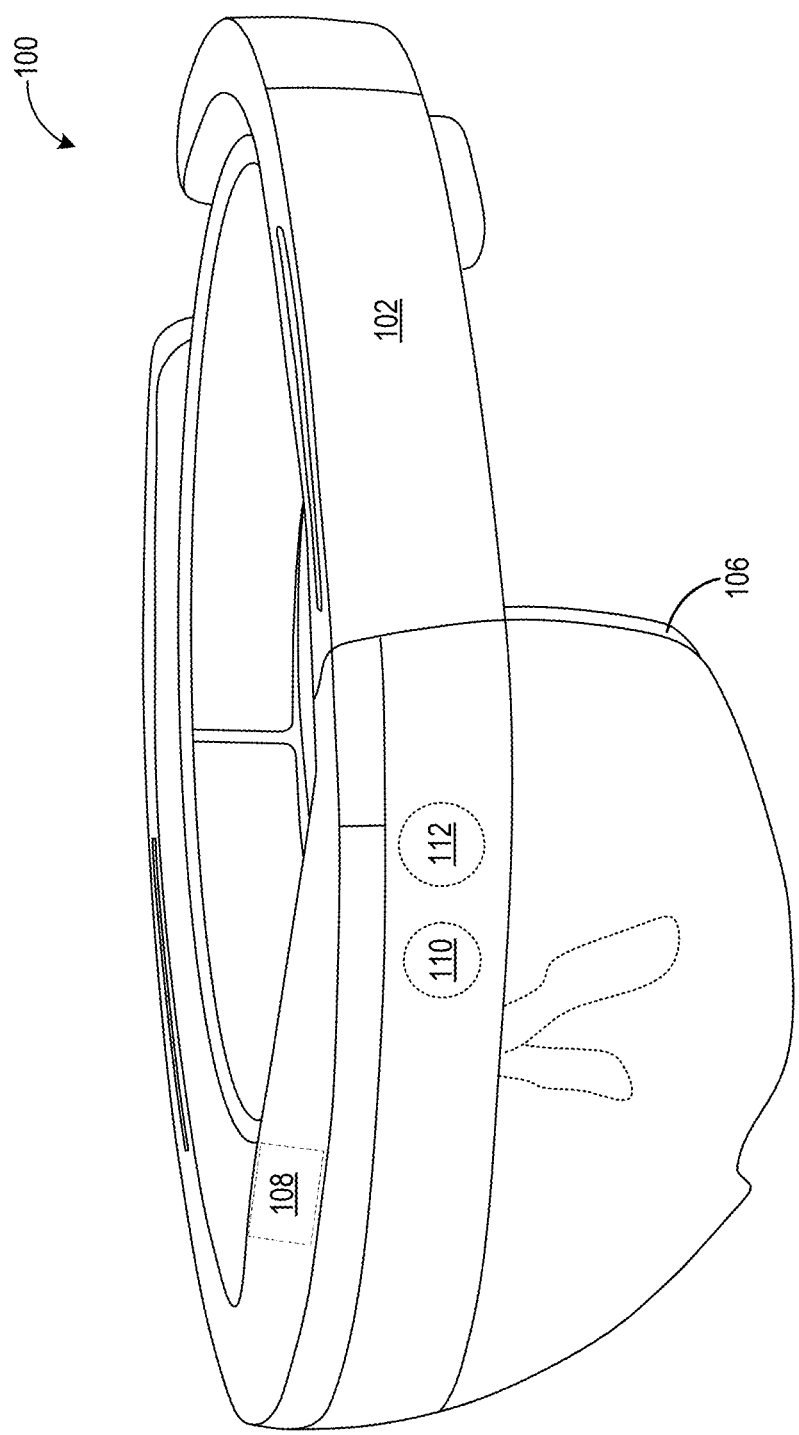
FIG. 1 shows an example head-mounted display device.

FIG. 1 schematically illustrates an example head-mounted display (HMD) device 100. HMD device 100 includes a frame 102 comprising a band wearable around a head of wearer, wherein the frame supports see-through display componentry positioned nearby the wearer's eyes. HMD device 100 may utilize augmented reality technologies to enable simultaneous viewing of virtual display imagery and a real world background. As such, HMD device 100 may generate virtual images via a see-through display system including a see-through veil 106. An electronic controller 108 is operatively coupled to the see-through display system and to other display componentry. Controller 108 includes one or more logic devices and one or more storage devices holding instructions executable by the logic device(s) to enact various functionalities of HMD device 100. HMD device 100 may further include other components, for example a two-dimensional image camera 110 (e.g. a visible light camera and/or infrared camera) and a depth camera 112, as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, and a GPS receiver.

Figure 2:
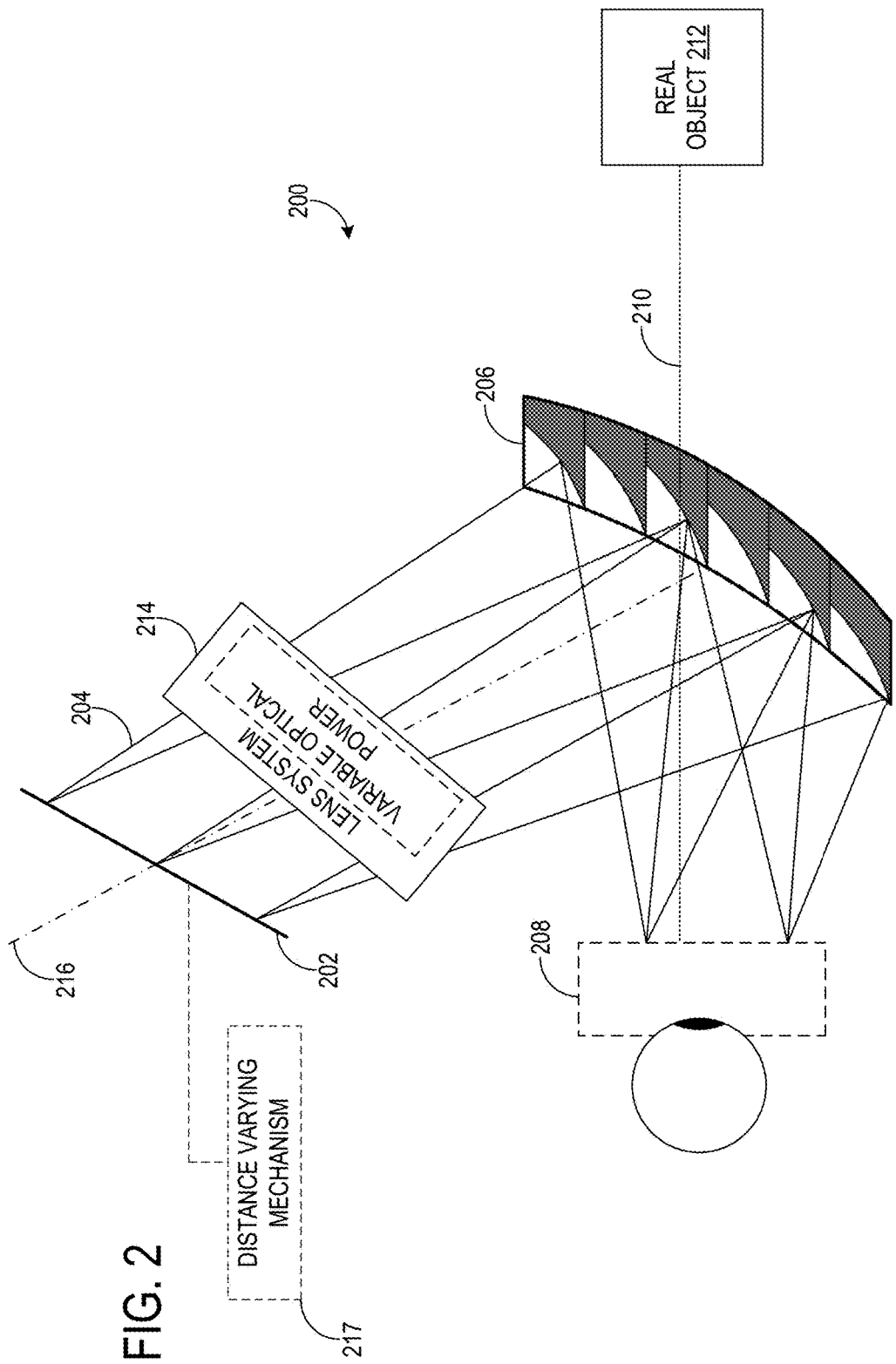
FIG. 2 schematically shows an example see-through display system.

FIG. 2 shows an example see-through display system 200 suitable for use with HMD device 100 to provide mixed reality imagery to a viewer. Display system 200 includes a display 202 configured to generate display light 204 for the presentation of virtual imagery. An example Fresnel combiner 206 is positioned to receive the display light 204 and redirect the display light toward an eyebox 208, where the display light can be viewed as a virtual image. Further, background light from a real-world background passes through Fresnel combiner 206, thereby allowing a wearer to view the virtual image mixed with the real-world background. To this end, Fresnel combiner 206 is at least partially transmissive to background light background light 210, illustrated as radiating from a real object 212 in the surrounding physical environment.

In some examples, Fresnel combiner 206 comprises optical power. In the example depicted in FIG. 2, Fresnel combiner 206 comprises a curved shape (e.g. curved inner and outer surfaces), and an optical power selected to cause redirected display light 204 to diverge. Conversely, Fresnel combiner 206 may exhibit substantially no optical power for transmitted background light. As such, background light 210 and other light from the surrounding physical environment may be transmitted through Fresnel combiner 206 substantially distortion-free. To enable the substantially undistorted transmission of background light, Fresnel combiner 206 may comprise first and second portions having substantially equal but opposite optical powers, as described in further detail below with reference to FIG. 3.

The optical power of Fresnel combiner 206 may enable the use of relatively short focal lengths and relatively high FOVs. As such, display system 200 may have a compact form factor, with an associated lower weight and lower curvature, compared to a Fresnel combiner without optical power. The curved geometry of Fresnel combiner 206 may better match the curvature of human faces relative to a non-curved Fresnel combiner, and thus may provide for a less bulky form factor when worn. Moreover, by directing diverging display light 204 to eyebox 208, the focal point of virtual images observed in the eyebox is located outside display system 200, which may help prevent the perception of virtual imagery by anyone not wearing the display device. When implemented in HMD device 100 (FIG. 1) or other device, the perception of virtual imagery may be restricted to a wearer of the HMD device, affording privacy from perception by external observers. In other examples, the display light may be collimated. With a relatively larger eyebox 208, a relatively larger range of interpupillary distances (IPDs) can be accommodated, which may help to reduce the need for an IPD adjustment mechanism in an HMD. Display system 200 may also minimize the loss of display light 204 during propagation compared to systems in which exit pupil or eyebox replication is used.

Display system 200 further includes a lens system comprising one or more lenses, illustrated schematically at 214, to deliver display light 204 to the Fresnel combiner. Lens system 214 may comprise any suitable optical component or components, and may include one or more transmissive, reflective, catadioptric, Fresnel, diffractive, holographic, and/or waveguide optics. Further, in some implementations lens system 214 may comprise variable optical power. To this end, lens system 214 may comprise any suitable adjustable optical elements, such as a liquid crystal lens or fluid compression lens. The variable optical power may be adjusted to change an apparent distance of a virtual image perceived in eyebox 208 over a suitable range (e.g., two diopters). Among other potential purposes, the apparent distance of a virtual image may be adjusted to allow the vergence of a user's eyes gazing at that virtual image to match the apparent depth of the virtual image based upon the stereoscopic renderings of the virtual image. This may help to avoid vergence accommodation conflict. The variable optical power of lens system 214 may also be leveraged to accommodate variation in user vision—e.g., to compensate for various types of vision impairment. Display 202 may be used alternatively or in addition to lens system 214 to change the apparent distance of virtual images 208. For example, display 202 may be configured for movement along an optical axis 216 via a suitable distance varying mechanism 217 (e.g., piezoelectric actuator).

Display 202 may be positioned in any suitable location within display system 200. For example, the display may be positioned toward a lateral side of the Fresnel combiner (e.g., proximate a user's temples), above the combiner, below the combiner, or between the left and right eye display areas of the combiner in various examples. Display 202 may utilize any suitable display technologies, including but not limited to liquid crystal on silicon (LCoS), micro organic light-emitting diode (OLED), microLED, microelectromechanical system (MEMS) scanner, digital light processing (DLP), phase panel, and transport liquid crystal display (LCD) display technologies.

Display system 200 may represent one of a left eye and a right eye display system. As such, a display similar to display system 200 may be utilized as the other of the left and right eye display systems to provide both the left and right eye display systems and thereby enable a binocular display system. In some implementations, left and right counterparts of one or more of the optical components in display system 200 may be respectively provided for the left and right eye display systems—e.g., left and right displays, lens systems, and Fresnel combiners. In other implementations, one or more of the optical components in display system 200 may be shared between the left and right display systems—e.g., a common display, lens system, and/or Fresnel combiner may be utilized.

Display system 200 may be incorporated in an HMD device in any suitable manner. With regard to the example of FIG. 1, Fresnel combiner 206 may be integral with veil 106, or positioned between veil 106 and a wearer. The shape of Fresnel combiner 206 and/or veil 106 may be selected based on any suitable optical properties and/or device design characteristics. Further, Fresnel combiner 206 may take any other suitable form than a combiner for an HMD. As one example, Fresnel combiner 206 may be used with a non-wearable head-up display device, such as in an automobile, airplane or other vehicle.

Where display system 200 is incorporated in HMD device 100, display 202 may be positioned within frame 102 (e.g., proximate veil 106), and lens system 214 also may be positioned within or proximate to the frame (e.g. between the frame and Fresnel combiner 206). Further, controller 108 may be operatively coupled to display 202 to control the production of images, and also may be connected to lens system 214 or a positional adjustment mechanism for display 202 to allow for adjustment of the apparent location of virtual images, as described above. These couplings may similarly apply to left and right optical and electronic componentry where separate left and right image production and display systems are used.

Figure 3:
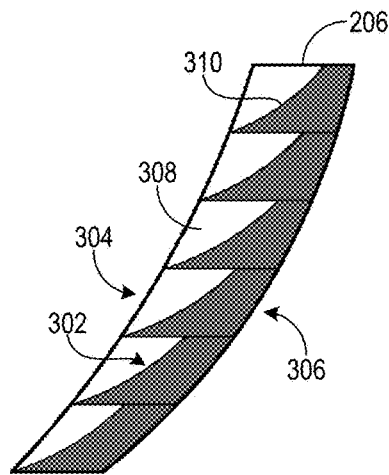
FIG. 3 shows an example Fresnel combiner for a see-through display system.

Fresnel combiner 206 may include a reflective coating to direct display light 204 toward eyebox 208. FIG. 3 illustrates Fresnel combiner 206 as including a reflective coating 302 located at an interface between positive and negative power portions of the Fresnel combiner, described in more detail below. Any suitable reflective coating may be used. For example, reflective coating 302 may comprise a thin metal coating or a dielectric dichroic coating. Further, in some implementations, reflective coating 302 may comprise multiple reflection band coatings to enable preferential reflection in two or more wavelength bands. For example, reflective coating 302 may comprise wavelength-selective structures configured to reflect light in a red wavelength band, a green wavelength band, and a blue wavelength band each corresponding to wavelength bands output by light sources of the display system. Reflective coating 302 also may be configured for reflection in other wavelength bands. The multiple reflection band coatings may be implemented via stacked dielectric layers, for example, and may enable high reflection without undue attenuation of background light.

As mentioned above, Fresnel combiner 206 may include a first portion 304 comprising positive optical power, and a second portion 306 comprising negative optical power, with the negative optical power substantially being an inverse of the positive optical power. In this way, the optical power of second portion 306 is substantially cancelled by the optical power of first portion 304. Fresnel combiner 206 comprises a plurality of facets 308. Facets 308 may be curved, aspheric, and/or may have other geometric properties. Further, reflective coating 302 may be formed on an inward-facing (user-facing) surface of second portion 306, or an outward-facing (world-facing) surface of first portion 304.

Figure 4:
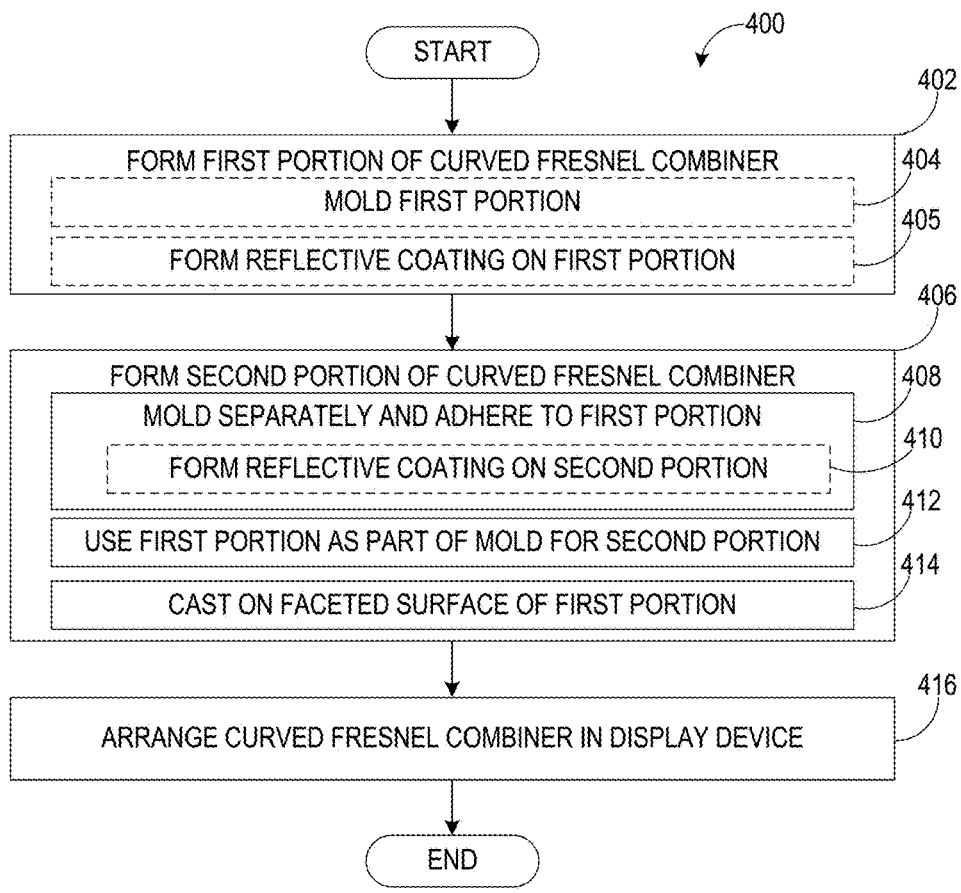
FIG. 4 shows a flowchart illustrating an example method of manufacturing a see-through display device.

FIG. 4 shows a flowchart illustrating an example method 400 of manufacturing a see-through display device, such as devices 100 and 200. Method 400 includes, at 402, forming a first portion of a curved Fresnel combiner, which may be the positive or the negative portion of combiner 206 as an example. Forming the first portion of the curved Fresnel combiner may include, for example, injection molding the first portion at 404, or performing another suitable molding or casting method.

Method 400 further may include, at 405, forming a reflective coating on a surface of the first portion. Where the first portion is the positive portion, the first coating may be formed on an outward-facing (e.g. world facing) surface of the positive portion. Where the first portion is the negative portion, forming the reflective coating may include forming the reflective coating on an inner-facing surface (e.g., user-facing surface) of the negative portion. The reflective coating may comprise a metal coating, dichroic coating, or multiple reflection band coatings, for example.

Method 400 further includes, at 406, forming a second portion of the curved Fresnel combiner, which may be the positive or negative portion, depending upon which portion was formed at 402. The second portion may be formed in any suitable manner. For example, the negative portion of the curved Fresnel combiner may be formed by molding (injection or other) the second portion separately from the first portion and then adhering the second portion to the first portion at 408 (e.g. using an optically clear adhesive). In this example, a reflective coating may be formed on the second portion prior to being adhered to the first portion, as indicated at 410. The reflective coating may be formed either in place of or in addition to the reflective coating on the first portion, described above with regard to process 405.

As another example, the first portion may be used as part of a mold to form the second portion, as shown at 412. In such an example, a curable or hardenable optical material may be applied to the faceted surface of the first portion, a molding surface may be applied to the curable material opposite the faceted surface of the first portion, and then the material may be cured or hardened. As yet another example, forming the second portion of the curved Fresnel combiner may include, at 414 casting the second portion on top of the first portion. Method 400 further includes, at 416, arranging the curved Fresnel combiner in the see-through display device.

Figure 5:
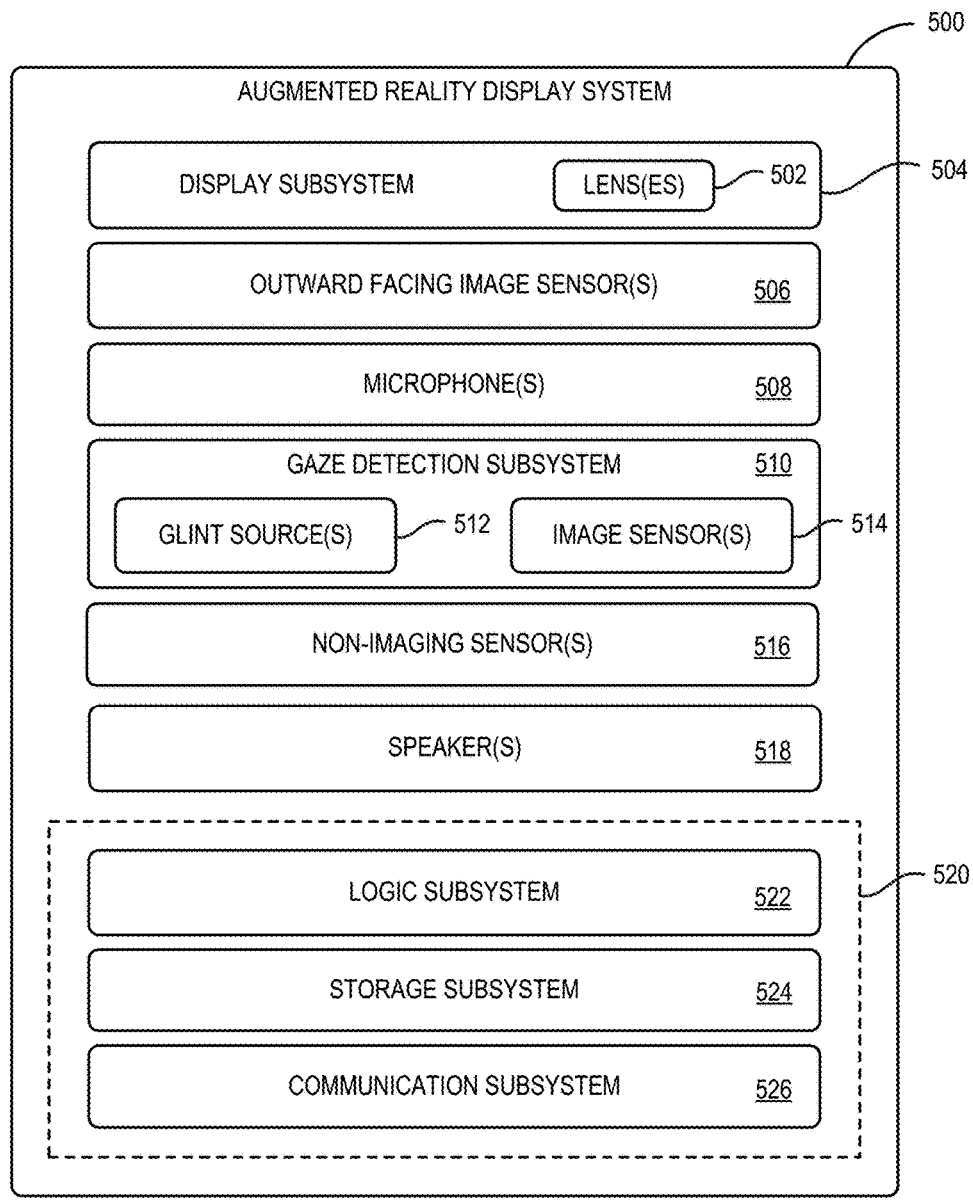
FIG. 5 shows a block diagram of an example mixed reality display system.

FIG. 5 shows a block diagram of an example augmented reality display system 500. The display system 500 includes one or more lenses 502 that form a part of a see-through display subsystem 504, such that images may be displayed via the lenses 502 (e.g. via reflection off and/or transmission through the lenses 502). The augmented reality display system 500 further includes one or more outward-facing image sensors 506 configured to acquire images of a real-world environment being viewed by a user, and may include one or more microphones 508 configured to detect sounds, such as voice commands from a user or ambient sounds. The outward-facing image sensors 506 may include one or more depth sensor(s) and/or one or more two-dimensional image sensor(s) (e.g. RGB image sensors).

The augmented reality display system 500 also may include a gaze detection subsystem 510 configured to detect a gaze of a user for detecting user input interacting with displayed virtual objects. The gaze detection subsystem 510 may be configured to determine gaze directions of each of a user's eyes in any suitable manner. In this example, the gaze detection subsystem 510 comprises one or more glint sources 512, such as infrared light sources configured to cause a glint of light to reflect from each eyeball of a user, and one or more image sensor(s) 514, such as inward-facing sensors, configured to capture an image of each eyeball of the user. Changes in glints from the user's eyeballs and/or a location of a user's pupil as determined from image data gathered via the image sensor(s) 514 may be used to determine a direction in which to project gaze lines from the user's eyes, e.g. for tracking a position signal on a displayed user interface.

The augmented reality display system 500 also may include additional sensors. For example, the augmented reality display system 500 may include non-imaging sensor(s) 516, examples of which may include but are not limited to an accelerometer, a gyroscopic sensor, a global positioning system (GPS) sensor, and an inertial measurement unit (IMU). Such sensor(s) may help to determine the position, location, and/or orientation of the augmented reality display system 500 within the environment, which may help provide accurate 3D mapping of the real-world environment.

Motion sensors, as well as the microphone(s) 508 and the gaze detection subsystem 510, also may be employed as user input devices, such that a user may interact with the augmented reality display system 500 via gestures of the eye, neck and/or head, as well as via verbal commands. It will be understood that sensors illustrated in FIG. 5 are shown for the purpose of example and are not intended to be limiting in any manner, as any other suitable sensors and/or combination of sensors may be utilized.

The augmented reality display system 500 further includes one or more speaker(s) 518, for example to provide audio outputs to a user for user interactions. The augmented reality display system 500 further includes a controller 520 having a logic subsystem 522 and a storage subsystem 524 in communication with the sensors, the gaze detection subsystem 510, the display subsystem 504, and/or other components. The storage subsystem 524 comprises instructions stored thereon that are executable by the logic subsystem 522, for example, to receive and interpret inputs from the sensors, to control the presentation of images and other outputs, and any perform other suitable tasks.

The logic subsystem 522 includes one or more physical devices configured to execute instructions. For example, the logic subsystem 522 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 522 may include one or more processors configured to execute software instructions. Additionally or alternatively, the logic subsystem 522 may include one or more hardware or firmware logic subsystems configured to execute hardware or firmware instructions. Processors of the logic subsystem 522 may be single-core or multi-core, and the instructions executed thereon may be configured for sequential, parallel, and/or distributed processing. Individual components of the logic subsystem 522 optionally may be distributed among two or more separate devices, which may be remotely located and/or configured for coordinated processing. Aspects of the logic subsystem 522 may be virtualized and executed by remotely accessible, networked computing devices configured in a cloud-computing configuration.

The storage subsystem 524 includes one or more physical devices configured to hold instructions executable by the logic subsystem to implement the methods and processes described herein. When such methods and processes are implemented, the state of the storage subsystem 524 may be transformed—e.g., to hold different data.

The storage subsystem 524 may include removable and/or built-in devices. The storage subsystem 524 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem 524 may include volatile, nonvolatile, dynamic, static, read/write, read-only, random-access, sequential-access, location-addressable, file-addressable, and/or content-addressable devices.

It will be appreciated that the storage subsystem 524 includes one or more physical devices. However, aspects of the instructions described herein alternatively may be propagated by a communication medium (e.g., an electromagnetic signal, an optical signal, etc.), as opposed to being stored on a storage device.

Aspects of the logic subsystem 522 and the storage subsystem 524 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The display subsystem 504 may be used to present a visual representation of data held by the storage subsystem 524. This visual representation may take the form of three-dimensional virtual objects, a graphical user interface (GUI) comprising a menu and/or other graphical user interface elements. As the herein described methods and processes change the data held by the storage subsystem 524, and thus transform the state of the storage subsystem, the state of see-through the display subsystem 504 may likewise be transformed to visually represent changes in the underlying data. The display subsystem 504 may include one or more display devices utilizing virtually any type of technology. Such display devices may be combined with the logic subsystem 522 and/or the storage subsystem 524 in a shared enclosure, or such display devices may be peripheral display devices.

The communication subsystem 526 may be configured to communicatively couple the augmented reality display system 500 with one or more other computing devices. The communication subsystem 526 may include wired and/or wireless communication devices compatible with one or more different communication protocols. As non-limiting examples, the communication subsystem 526 may be configured for communication via a wireless telephone network, or a wired or wireless local- or wide-area network. In some embodiments, the communication subsystem 526 may allow the augmented reality display system 500 to send and/or receive data to and/or from other devices via a network such as the Internet.

It will be appreciated that the depicted augmented reality display system 500 is described for the purpose of example, and is not meant to be limiting. It is to be further understood that the augmented reality display system 500 may include additional and/or alternative sensors, cameras, microphones, input devices, output devices, etc. than those shown without departing from the scope of this disclosure. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on the augmented reality display system 500 or other suitable display system, or may be executable remotely on a computing system in communication with the augmented reality display system 500.

Another example provides a head-mounted display device comprising a display, a lens system, and a curved Fresnel combiner configured to direct light received from the display via the lens system toward an eyebox and being at least partially transmissive to background light. In such an example, the light directed toward the eyebox alternatively or additionally may form a virtual image from the perspective of a viewer. In such an example, the display alternatively or additionally may be configured to be moveable to change an apparent distance of a virtual image. In such an example, the lens system alternatively or additionally may comprise variable optical power. In such an example, the Fresnel combiner alternatively or additionally may comprise a first portion comprising positive optical power, and a second portion comprising negative optical power. In such an example, the second portion alternatively or additionally may comprise a cast or molded layer arranged on the first portion. In such an example, the second portion alternatively or additionally may be adhered to the first portion via an adhesive. In such an example, the Fresnel combiner alternatively or additionally may comprise a reflective coating. In such an example, the reflective coating alternatively or additionally may be formed at an interface between a portion of the curved Fresnel combiner with negative optical power and a portion of the curved Fresnel combiner with positive optical power. In such an example, the reflective coating alternatively or additionally may be configured to selectively reflect one or more color bands. In such an example, the curved Fresnel combiner alternatively or additionally may comprise one or more aspheric facets.

Another example provides a head-mounted display device comprising a display, a lens system, and a curved Fresnel combiner having optical power, the curved Fresnel combiner being configured to direct light received from the display via the lens system toward an eyebox and being at least partially transmissive to background light. In such an example, the display alternatively or additionally may be configured to be moveable along an optical axis to change an apparent distance of a virtual image. In such an example, the lens system alternatively or additionally may comprise variable optical power. In such an example, the curved Fresnel combiner alternatively or additionally may have optical power. In such an example, the curved Fresnel combiner alternatively or additionally may comprise a first portion comprising positive optical power, and a second portion comprising negative optical power, the negative optical power being substantially an inverse of the positive optical power. In such an example, the curved Fresnel combiner alternatively or additionally may comprise a reflective coating between a portion with negative optical power and a portion with positive optical power.

Another example provides a method of manufacturing a see-through display device, the method comprising forming a first portion of a curved Fresnel combiner, forming a reflective coating on a surface of the first portion, forming a second portion of the curved Fresnel combiner such that the reflective coating is located at an interface of the first portion of the curved Fresnel combiner and the second portion of the curved Fresnel combiner, and arranging the Fresnel combiner in a display device. In such an example, forming the second portion of the curved Fresnel combiner alternatively or additionally may include casting or molding the second portion on the first portion of the Fresnel combiner. In such an example, forming the second portion of the curved Fresnel combiner alternatively or additionally may include adhering the second portion to the first portion of the curved Fresnel combiner with an adhesive.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-mounted display device, comprising:
   a display;
   a lens system; and
   a curved Fresnel combiner comprising a first portion having a first faceted surface and positive optical power and a second portion having a second faceted surface and negative optical power, the curved Fresnel combiner configured to direct light received from the display via the lens system toward an eyebox and being at least partially transmissive to background light.

2. The head-mounted display device of claim 1, wherein the light directed toward the eyebox forms a virtual image from the perspective of a viewer.

3. The head-mounted display device of claim 1, wherein the display is configured to be moveable to change an apparent distance of a virtual image.

4. The head-mounted display device of claim 1, wherein the lens system comprises variable optical power.

5. The head-mounted display device of claim 1, wherein the second portion comprises a cast or molded layer arranged on the first portion.

6. The head-mounted display device of claim 1, wherein the second portion is adhered to the first portion via an adhesive.

7. The head-mounted display device of claim 1, wherein the Fresnel combiner comprises a reflective coating.

8. The head-mounted display device of claim 7, wherein the reflective coating is formed at an interface between the second faceted surface of the second portion of the curved Fresnel combiner and the first faceted surface of the first portion of the curved Fresnel combiner.

9. The head-mounted display device of claim 7, wherein the reflective coating is configured to selectively reflect one or more color bands.

10. The head-mounted display device of claim 1, wherein one or more of the first faceted surface and/or the second faceted surface of the curved Fresnel combiner comprises one or more aspheric facets.

11. A head-mounted display device, comprising:
    a display;
    a lens system; and
    a curved Fresnel combiner comprising a first portion having a first faceted surface and positive optical power, a second portion having a second faceted surface and negative optical power, and a reflective coating positioned between the first portion and the second portion, the curved Fresnel combiner being configured to direct light received from the display via the lens system toward an eyebox and being at least partially transmissive to background light.

12. The head-mounted display device of claim 11, wherein the display is configured to be moveable along an optical axis to change an apparent distance of a virtual image.

13. The head-mounted display device of claim 11, wherein the lens system comprises variable optical power.

14. The head-mounted display device of claim 11, wherein the reflective coating is configured to selectively reflect one or more color bands.

15. The head-mounted display device of claim 11, wherein the negative optical power is substantially an inverse of the positive optical power.

16. A method of manufacturing a see-through display device, the method comprising:
    forming a first portion of a curved Fresnel combiner, the first portion comprising a first faceted surface and positive optical power;
    forming a reflective coating on the first faceted surface of the first portion;
    forming a second portion of the curved Fresnel combiner such that the reflective coating is located at an interface of the first portion of the curved Fresnel combiner and the second portion of the curved Fresnel combiner, the second portion comprising a second faceted surface and negative optical power; and
    arranging the Fresnel combiner in a display device.

17. The method of claim 16, wherein forming the second portion of the curved Fresnel combiner includes casting or molding the second portion on the first portion of the Fresnel combiner.

18. The method of claim 16, wherein forming the second portion of the curved Fresnel combiner includes adhering the second portion to the first portion of the curved Fresnel combiner with an adhesive.

* * * * *